(12) United States Patent
Granottier et al.

(10) Patent No.: US 11,725,722 B2
(45) Date of Patent: Aug. 15, 2023

(54) ELECTRIC POWERTRAIN FOR TRUCK

(71) Applicant: VOLVO TRUCK CORPORATION, Gothenburg (SE)

(72) Inventors: Nicolas Granottier, Lyons (FR); Baptiste Boutin, La Tour du Pin (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/657,695

(22) Filed: Apr. 1, 2022

(65) Prior Publication Data
US 2022/0316583 A1 Oct. 6, 2022

(30) Foreign Application Priority Data

Apr. 2, 2021 (EP) ..................................... 21166815

(51) Int. Cl.
*F16H 57/04* (2010.01)
*F16H 57/027* (2012.01)
*F16H 57/02* (2012.01)

(52) U.S. Cl.
CPC ....... *F16H 57/0483* (2013.01); *F16H 57/027* (2013.01); *F16H 57/0417* (2013.01); *F16H 57/0436* (2013.01); *F16H 57/0476* (2013.01); *F16H 2057/02034* (2013.01); *F16H 2057/02052* (2013.01)

(58) Field of Classification Search
CPC ....... F16H 2057/02034; F16H 57/0445; F16H 57/045; F16H 57/0476; F16H 57/0483
See application file for complete search history.

(56) References Cited

U.S. PATENT DOCUMENTS

| 3,800,913 | A |   | 4/1974 | Schmitt |
| 4,296,650 | A | * | 10/1981 | Kains ...................... F16H 3/663 |
|   |   |   |   | 475/140 |
| 9,409,477 | B2 |   | 8/2016 | Wang |
| 9,511,667 | B2 | * | 12/2016 | Thaler .................... B60K 17/16 |

(Continued)

FOREIGN PATENT DOCUMENTS

| DE | 102012112379 A1 | 6/2014 |
| JP | 2003166630 A | 6/2003 |

(Continued)

OTHER PUBLICATIONS

European Search Report dated Aug. 27, 2021 in corresponding European Patent Application No. 21166815.7, 8 pages.

*Primary Examiner* — Jake Cook
(74) *Attorney, Agent, or Firm* — Venable LLP; Jeffri A. Kaminski (57) ABSTRACT

A powertrain assembly includes one or several electric motors, a gearbox comprising a gearbox housing, an axle comprising: an axle housing, movable parts inside axle housing, comprising a shaft for a wheel, a lubricating system comprising an axle lubricating device comprising an axle oil sump and a gearbox lubricating device comprising a gearbox oil sump inside the gearbox housing which is a dry sump having an oil storage area which is separate from said gearbox oil sump, a scavenge pump and a first duct configured to retrieve oil from gear box oil sump and to convey the retrieved oil up to the oil storage area, and a main pump and a second duct configured to convey oil from the storage oil area to lubricate the gears of the gearbox.

15 Claims, 4 Drawing Sheets

(56) References Cited

U.S. PATENT DOCUMENTS

| | | | |
|---|---|---|---|
| 10,106,034 B2* | 10/2018 | Thaler | B60K 17/3462 |
| 2014/0366956 A1* | 12/2014 | Wiens | F16H 57/045 |
| | | | 137/204 |
| 2015/0057124 A1* | 2/2015 | Pump | F16H 57/0483 |
| | | | 475/160 |
| 2020/0240511 A1* | 7/2020 | Hori | F16H 57/0482 |

FOREIGN PATENT DOCUMENTS

| | | |
|---|---|---|
| WO | 2008076061 A1 | 6/2008 |
| WO | 2017220296 A1 | 12/2017 |
| WO | 2020109437 A2 | 6/2020 |

* cited by examiner

FIG. 3 (INV)

FIG. 4 (INV)

ELECTRIC POWERTRAIN FOR TRUCK

The present disclosure relates to a powertrain assembly comprising an axle, a gearbox and an electric motor for use in an electric vehicle, a hybrid vehicle or a trailer towed by a vehicle. In such a powertrain assembly, a drive wheel shaft of the axle receives power/torque from an output of the gearbox, an input of the gearbox receiving power/torque from the electric motor.

The present disclosure can be applied in vehicles such as light, medium or heavy-duty, such as trucks, buses, and construction equipment. Although the present disclosure will be described with respect to a truck, the present disclosure is not restricted to this vehicle but may also be used in other vehicle such as passenger's cars.

TECHNICAL FIELD

This disclosure pertains to the field of powertrain assembly for heavy-duty vehicle, and in particularly powertrain assembly comprising an axle, a gearbox and an electric motor. Electric powertrain assembly for heavy-duty vehicle comprises said axle including an axle housing and movable parts inside said housing. Movable parts include typically on a same rotation axis, a first shaft for a first wheel (e.g. one or several left wheel(s)), a second shaft for a second wheel (e.g. one or several right wheel(s)), and usually a differential gear shaft. Shafts (first and second) are guided in axle housing by guides means such as bearings.

Differential gear comprises at input a ring wheel that receives power/torque from an output gear wheel of the gearbox. The gearbox comprises the output wheel gear and an input, such as an input gear wheel receiving power/torque from the electric motor. The gearbox typically comprises different shafts for the gears, and a shifting system configured to change the gear ratio between the output and the input of the gearbox.

Movable parts such as bearings, shafts and gears are cooled and lubricated by oil, commonly using a "wet sump" lubrication system that is discussed below.

BACKGROUND ART

In the field of the transport industry, there is a need to deal with emissions regulation requirements which are becoming more and more demanding, and cities suffering from a big volume traffic start to forbid internal combustion engine vehicles in their city centers.

Vehicles and more particularly electric/hybrid vehicles typically use an electric motor for running one or more wheels through a drive wheel shaft. Typically, as discussed above, an axle includes two drive wheel shafts (said first shaft and second shaft, one for each wheel—left or right. Most of the electric motors are, however, designed to run at high-speed/low torque conditions as compared with known internal combustion engines running at high torque/low speed condition.

Fulfilling the torque demand at the wheel(s) of a vehicle is important for startability of a vehicle in different conditions, for instance in slopes. There is thus a need for having a wide-gear reduction ratio through the gearbox, which can be typically between 1:20-1:50. Such a wide-gear reduction is commonly fulfilled via a gearbox with several reduction stages which consequently needs more space and leaves limited volume of space for the integration of other parts (for instance for the batteries, suspension assemblies . . . ).

Unlike the standard transmission systems for gasoline/diesel engines where the transmission can be positioned in different positions and connected to the drive shaft through a shaft assembly, in case of the electric/hybrid vehicles, there is a need of accommodating the electric motor and the gearbox in the vicinity of the drive wheel axle. Typically, if the electric motor share power/torque on both shafts (first and second) a differential gear is needed to distribute power/torque to each wheel (left or right).

U.S. Pat. No. 9,409,477 is an example of such prior art teaching a powertrain assembly where the electric motor and the gearbox are in the vicinity of the drive wheel axle. In U.S. Pat. No. 9,409,477 the electric motor and the gearbox are disposed on a same side of the drive wheel axle. In particularly, drive wheel shafts of the axle (first and second shaft) typically share a same axle rotation axis, whereas shafts of the gearbox holding the different gears of the gearbox, on one hand, and output shaft of the electric motor, on the other hand, are spread on several rotations axis that are distinct and parallel to axle wheel shaft rotation axis. An output gear of the gearbox transmits power/torque to an input ring wheel of a differential gear. Differential gear further comprises two outputs for distributing power/torque respectively to the first shaft (e.g. for a right drive wheel) and the second shaft (for a left drive wheel).

U.S. Pat. No. 9,409,477 simplified drawing seems to show that the gears of the gearbox and the gears of the differential gear are housed in a same crankcase (or housing). However axle gears and bearings, on one hand, and gearbox gears, one the other hand, have typically their own lubrication system which is commonly a "wet sump lubrication system" for both, and thus their own housing.

Such gears and other movable part, such as for instance bearings for the rotation of wheel shaft are typically cooled and lubricate using a "wet sump" lubricating system at the gearbox and a distinct "wet sump" lubrication system at the axle.

It is meant by "wet sump lubrication system", hereafter simply called "wet sump" a lubrication system whereby the crankcase (or housing) sump is used as an integral oil reservoir. At least part of the rotating movable parts such as bearings and/or gears (and at least lower gears) are immersed in the level of oil in the sump.

Gears rotating in oil results in high power losses called "churning losses" simply called "splash losses" hereinafter. According to inventor's findings, since electric motor are typically running at high speed compared to combustion engine that runs at lower speed/high torque, "splash losses" may be high at the gearbox level in an electric powertrain assembly. Similarly, axle gears and bearing needs to be immersed in a relatively high level of oil to obtain proper lubrication, which also generates power losses, and poor efficiency at the drive axle level.

According to inventor's findings, a secondary drawback of such lubrication system where axle gears and bearings, on the one hand, and gearbox gears, on the other hand, have typically their own lubrication wet sump device is that it requires to have an oil tight separation between the gearbox oil lubrication device and the axle lubrication device with an oil tight seal. Such an oil tight seal may be complex and costly, in order to avoid a mixing of oil between the two distinct oil lubrication wet sump devices.

According to inventor's findings, such an oil tight seal design between the axle lubrication device and the gearbox lubrication device further implies that the gearbox housing and the axle housing (that are separated in an oil tight manner) have their own oil inlet and their own breathing system.

WO2008/076061 however teaches to reduce "splash losses" in certain type of gearbox that have a direct drive between an input shaft and an output shaft, and wherein a level of oil in an oil sump of the gear box housing is maintained to have a peripherical portion of lower gearwheel immersed. According to WO2008/076061 the splashes losses may be reduced by lowering the level of oil in an oil sump when direct drive of the gearbox is engaged. The oil level is restored for operation of the gearbox with gear combinations when the direct drive is disengaged.

To that purpose, the housing of gearbox has an adjacent oil gathering tank which has an upper oil inlet which during operation of gear combination is exposed to being splashed with oil projected by lower gearwheel which are immerser in the oil sump, but also a lower outlet for leading the oil accumulated in the tank back to the oil sump, which is closable during direct drive in order to lower the level of oil in the oil sump, and is openable to restore the level of oil alternatively.

According the inventor's findings, this solution of reducing splashes losses by lowering oil level in the oil sump has several drawbacks, in particularly:

WO2008/076061 teaching is dedicated only to certain type of gearbox having a direct drive mode between input and output shaft, and cannot be implemented to others gearboxes, WO2008/076061 that teaches to reduce splashes losses at gearbox by reducing level of oil in the oil sump of gearbox when direct drive is engaged strengthen the need to have a separate lubrication at axle: indeed axle gears and bearing in axle oil sump always needs to be immersed in a relatively high level of oil to obtain proper lubrication: Therefore said oil tight seal that is complex and costly becomes mandatory, in addition to have separate oil inlets and breathing systems respectively at gearbox housing and at axle housing, WO2008/076061 only reduces splashes losses at gearbox level, but not at the axle level.

As opposed to "wet sump", prior art also knows "dry sump" whereby oil used to cool and lubricated the movable parts (e.g. gears) is pumped from an accumulator reservoir and spayed on the active gearwheels. According to introduction of WO2008/076061 a first drawback of dry sump lubrication device is that it requires an energy-consuming pump and special nozzles for spraying the gearwheel.

In order to avoid the oil accumulating in the sump to impact gears during to movement of vehicle, for instance when the vehicle turns hard in corners (or drives on bumps . . . ), it is further knows to have the oil accumulator as a reservoir which is advantageously separate and distinct from the crankcase sump. In such design, as soon the dropping oil reaches the sump, the oil is pumped continuously typically by a scavenge pump and conveyed to the oil storage area which is separate from oil sump.

According to inventor's findings, if providing an oil storage area which is separate from the oil sump is beneficial to avoid splashes losses when the vehicles turns hard or drive on bumps, this design is hard to implement, for instance in powertrain assembly such as U.S. Pat. No. 9,409,477, comprising a gearbox with several gear ratio, which implies already a lack of compactness, and thus a lack of space for the integration of other parts, and in particularly a lack of space for this supplementary oil storage which needs to be separate to the oil sump of the gearbox.

Prior art also knows from DE102012112379 a compact design drive axle where an electric motor, a planetary transmission and wheel shaft are all accommodated along a same axle axis. The drive motor is immersed in oil of axle oil sump which implies high splashes losses. Transmission planetary gear is a single ratio gear.

Prior art also knows from WO2020/109437 an electric motor and a gear transmission that share a same housing with a water jacket and an oil sump where the oil accumulates. Oil sump is used to lubricate the gears of the gears of transmission. Some of the oil is pumped to be conveyed in a cooling channel inside a shaft of the electric motor. Oil storage area is the oil sump in housing, and thus is not a separate area from the sump.

SUMMARY

This disclosure improves the situation.

It is proposed a powertrain assembly comprising:
one or several electric motors,
a gearbox comprising a gearbox housing receiving gears therein, including at least one input gear wheel, engaged with said electric motor, and an output gear wheel,
an axle comprising:
an axle housing,
movable parts inside axle housing, comprising a shaft for a wheel, said shaft receiving power from the output gear,
a lubricating system comprising an axle lubricating device comprising an axle oil sump disposed inside the axle housing and a gearbox lubricating device comprising a gearbox oil sump inside the gearbox housing.

According to the present disclosure said gearbox lubricating device is a dry sump lubricating system, comprising:
an oil storage area which is separate from said gearbox oil sump,
a scavenge pump and a first duct configured to retrieve oil from the gear box oil sump and to convey the retrieved oil up to the oil storage area, and,
a main pump and a second duct configured to convey oil from the storage oil area to lubricate the gears of the gearbox,
and wherein said oil storage area is formed in the axle oil sump.

The following features, can be optionally implemented, separately or in combination one with the others:

Said scavenge pump conveys oil to lubricate movable parts in axle housing at a high delivery point whose level position is higher than the level of oil in the axle oil sump, said high delivery point being configured so that the conveyed oil lubricates the movable parts before falling in the axle oil sump;

The axle housing and the gearbox housing are contiguous, the internal atmosphere of axle housing and the internal atmosphere of gear box housing being preferably in gas communication;

The axle housing and the gearbox housing may share a single breathing system configured to equilibrate the pressure of the internal atmosphere of axle housing and the pressure of the internal atmosphere of gear box housing with the pressure of an outside atmosphere;

Axle oil sump and the gearbox oil sump may share a single oil filing input at axle housing;

The lubricating system comprises an oil cooler configured to cool oil conveyed by first duct. Alternatively, the oil cooler may be configured to cool oil conveyed by second duct.

Powertrain assembly may comprise an oil filter configured to protect main pump, and possibly a by-pass valve configured to bypass said oil filter when said oil filter is clogged.

Said gearbox comprises a system configured to change the gear ratio between output gear wheel and input gear wheel, typically including a shifting system comprising a dog clutch.

The movable parts in axle housing comprises:

a differential gear having a differential ring wheel at input, a first output and a second output, said differential ring wheel engaged with output gear of said gearbox, a first shaft for a first wheel and a second shaft for a second wheel coupled respectively to first output and second output of said differential gear.

The scavenge pump and/or main pump is driven by a shaft that receives power from axle's movable part, or the gear box. Alternatively, the scavenge pump and/or main pump is an electrical pump.

Said axle lubricating device and said gearbox lubricating device are deprived of an oil reservoir which is distinct from the axle oil sump and the gearbox oil sump.

According to a second aspect, the present disclosure concerns a vehicle chosen among trucks, buses, or construction equipment comprising a powertrain assembly according to present disclosure.

BRIEF DESCRIPTION OF DRAWINGS

Other features, details and advantages will be shown in the following detailed description and on the figures, on which.

DETAILED DESCRIPTION

The present disclosure relates to a powertrain assembly 1 comprising one or several electric motors 2; 2', and a gearbox 3 comprising a gearbox housing 30 receiving gears therein, including at least one input gear wheel 31, 31', engaged with said electric motor 2, 2', and an output gear wheel 32. The gearbox 3 has preferably several gear ratios, the gearbox comprising preferably a system configured to change the gear ratio between output gear wheel 32 and input gear wheel 3 and may be configured to provide different gear combinations. It thus may comprise a shifting system having typically a dog clutch to change the gear ratio.

Figure 1:
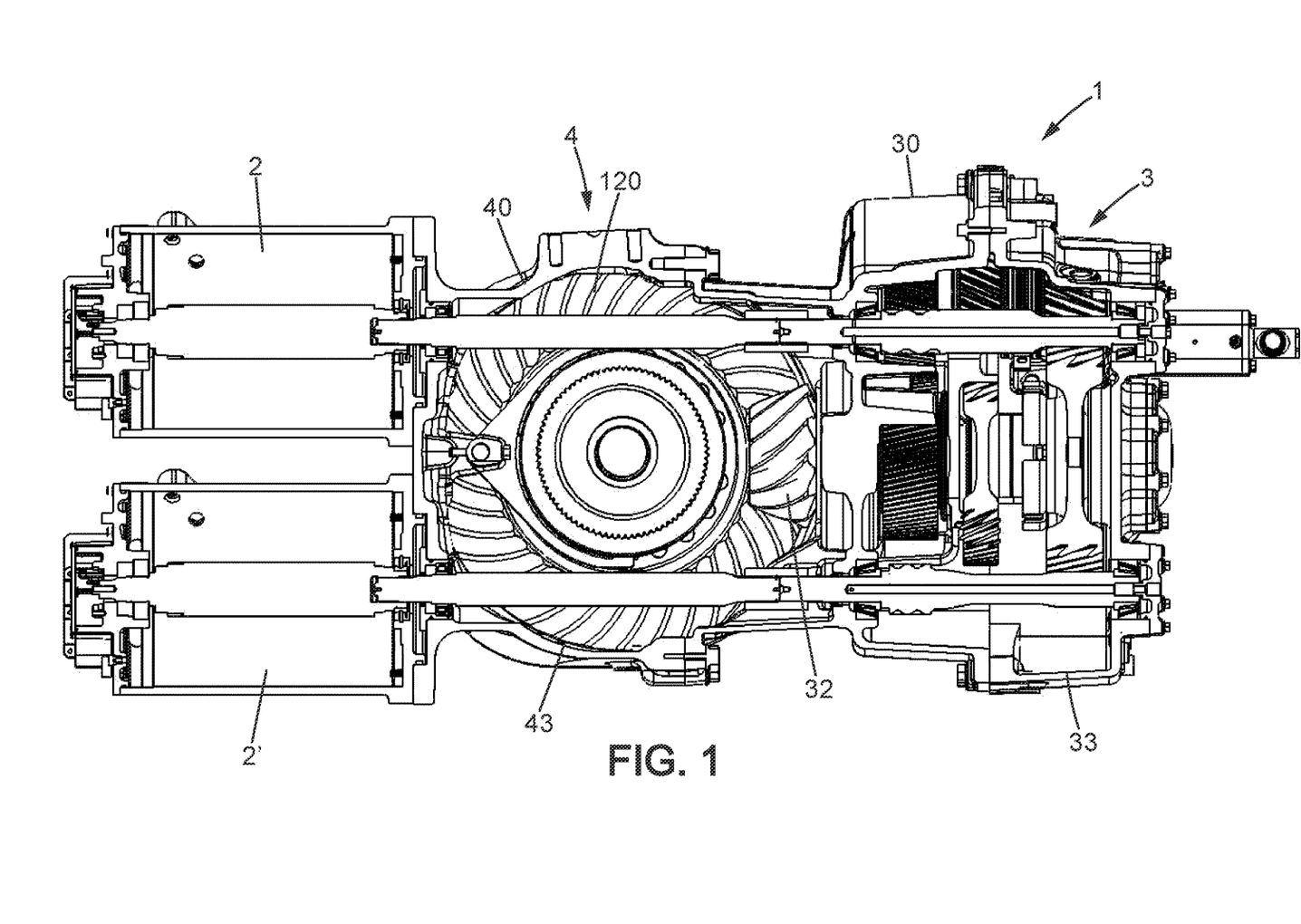
FIG. 1 is a cross-sectional view of a powertrain according to the present disclosure, showing in the middle, the axle including the axle housing, an axle oil sump and a ring wheel input of a differential gear, on the left, two electric motors, and on the right, a gearbox having two inputs, each connected with one of the two electric motors, and an output shaft with an output conical gear meshing with ring wheel at input of the differential gear.

FIG. 1 discloses an embodiment where the gearbox 3 has two inputs, including a first input gear wheel 31 connected to a rotor of a first electric motor 2 and a second input gear wheel 31' connected to a rotor of a second electric motor 2'.

The gearbox may be configured to provide a wide-gear reduction ratio through the gearbox, which can be typically between 1:20-1:50.

Powertrain assembly 1 comprises also an axle 4 comprising an axle housing 40 and movable parts inside axle housing, comprising a shaft 41;42 for a wheel, said shaft receiving power from the output gear wheel 32.

The axle housing 40 and the gearbox housing 30 are typically contiguous, The movable parts in axle housing 40 may also comprise: a differential gear 12 having a differential ring wheel 120 at input, a first output 121 and a second output 122, said differential ring wheel engaged with output gear wheel 32 of said gearbox.

A first shaft T1 for a first wheel (e.g. one or several left wheel(s)) and a second shaft T2 for a second wheel (e.g. one or several right wheel(s)) coupled respectively to first output 121 and second output 122 of said differential gear.

The different shafts (input shaft, output shaft, and possibly one or several auxiliary shaft) holding the different gears of the gearbox may be disposed parallel to each other. The shafts of the gearbox may be parallel to axle rotation axis T, as shown in schematic view of FIG. 2, or may be perpendicular to axle rotation axis T, as can be understood from embodiment of FIG. 1 and FIG. 3. The output gear wheel 32 and the ring wheel 120 of differential gear may be conical gear wheels having perpendicular rotation axis, as shown on FIG. 1.

Figure 2:
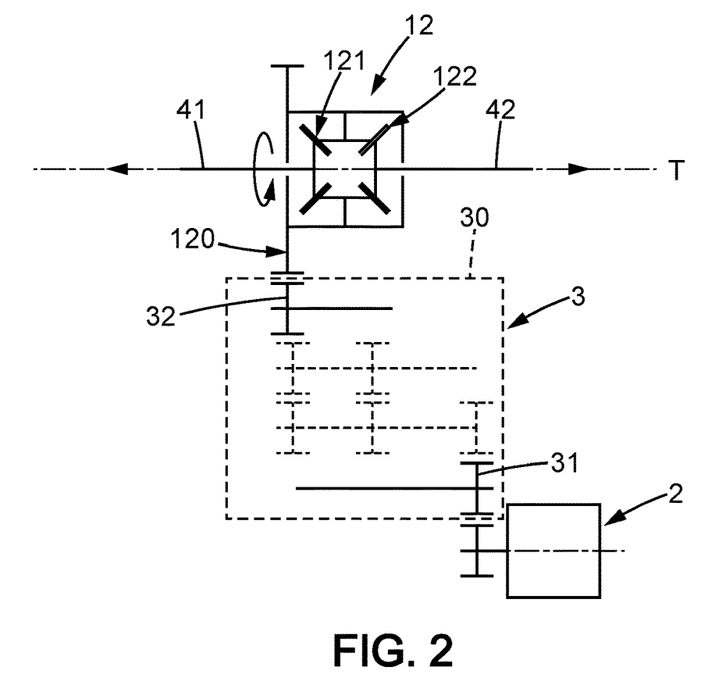
FIG. 2 is a simplified schematic view of the kinematic of a powertrain according to the present disclosure, showing, the electric motor, the gearbox, including an input receiving power/torque from the electric motor and an output connected to a ring wheel gear of a differential gear, the gearbox having a shifting system for changing gear ratio between input and output, and the differential gear having a first output connected to a first shaft and a second output connected to a second shaft.
Figure 3:
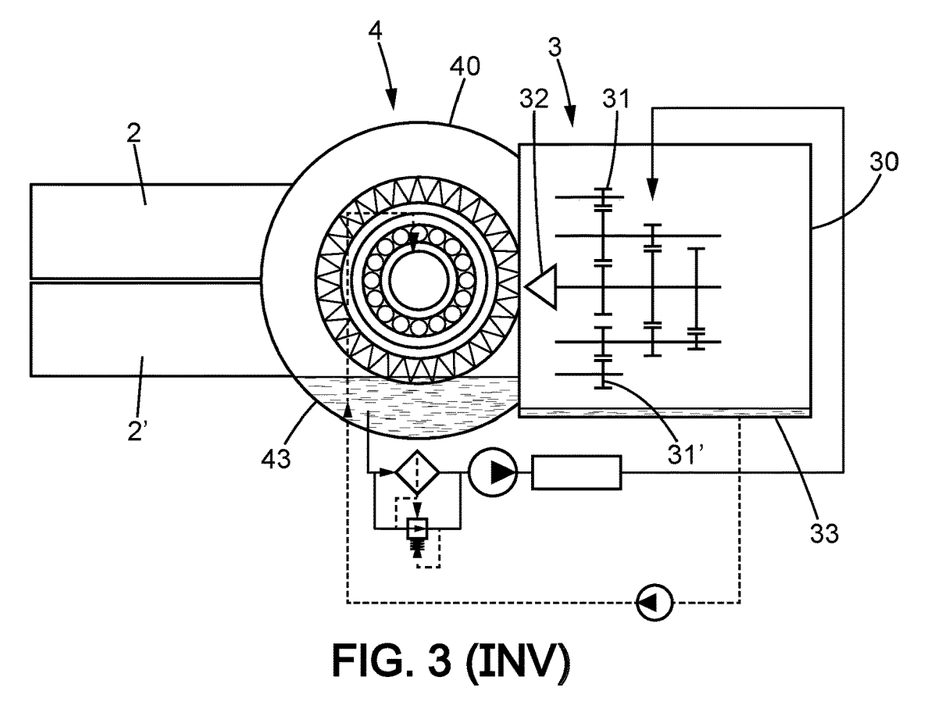
FIG. 3 is a schematic view of the lubrication system of the gearbox according to the claimed disclosure which is a "dry sump" having a separate storage oil area, distinct from gearbox oil sump, which is formed in axle oil sump, a main pump being configured to pump oil from the axle oil sump to spray oil on the active gears of gearbox, and a scavenge pump being configured to withdraw oil in the gearbox oil sump to convey oil in axle oil sump at a high point delivery level, reducing the level of oil in the axle sump compared to prior art.

The electric motor 2 may be disposed on the same side of the axle 4 than the side of the gearbox 3, as can be understood form FIG. 2, or alternatively the gearbox 3 and the electric motor(s) 2, 2', may be disposed respectively on both sides of the axles, as shown on FIG. 1 or FIG. 3.

The powertrain assembly comprises a lubricating system comprising an axle lubricating device comprising an axle oil sump 43 disposed inside the axle housing 40 and a gearbox lubricating device comprising a gearbox oil sump 33 inside the gearbox housing 30.

Axle oil sump 43 is formed in the lower part of axe housing 40 and gearbox oil sump 33 is formed in the lower part of gearbox housing 30.

Advantageously, the gearbox lubricating device is a dry sump lubricating system, comprising an oil storage area which is separate from said gearbox oil sump 33, a scavenge pump 5 and a first duct 6 configured to retrieve oil from gear box oil sump 33 and to convey the retrieved oil up to the oil storage area, and, a main pump 7 and a second duct 8 configured to convey oil from the storage oil area to lubricate the gears of the gearbox 3.

Ducts (first duct and second duct) may by flexible pipe and/or may be rigid. Duct may be rigid channel in the housing, that are obtained in the axle housing and or/gearbox housing during manufacturing, in particularly by subtractive manufacturing, or additive manufacturing or by moulding manufacturing.

One or serval nozzles can be used to spray the oil on the gears of gearbox, under the pressure of main pump 7. Since gears are lubricated by spraying, and not by immersion in oil as in a wet sump, splashes losses are drastically reduced at gearbox level, improving efficiency at gearbox level. Such a dry sump lubrication device is implemented for the rotating gears of gearbox in priority, since they receive power and torque from the rotor of electric motor that usually runs at high speed/low torque compared to a combustion engine.

Since oil storage area is separate from gearbox oil sump, and since the scavenge pump is retrieving oil at gearbox oil sump and conveying it up to oil storage area, in particularly continuously, it advantageously prevents the oil to build up in gearbox box oil sump. When the vehicle (comprising the powertrain assembly) is turning hard for instance or driving on bumps, oil in gearbox oil sump is low enough to avoid splashes losses due to inertia.

Figure 4:
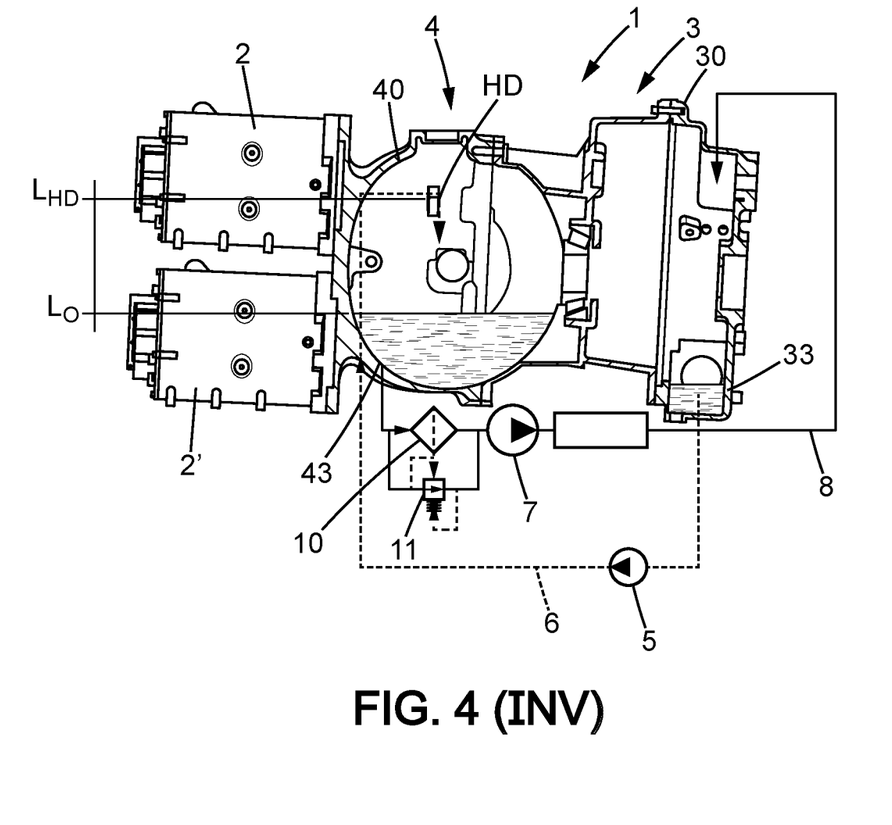
FIG. 4 is a perspective view of FIG. 3, the gears being omitted.
Figure 5:
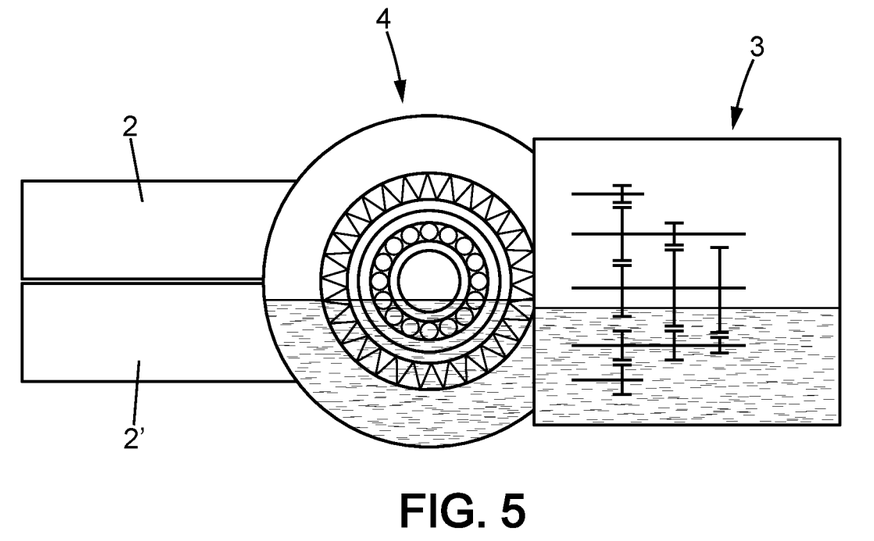
FIG. 5 is a schematic view of the non-claimed disclosure wherein gears of the gearbox and gears of the axle are immersed in a same oil sump, generating high splash losses.
Figure 6:
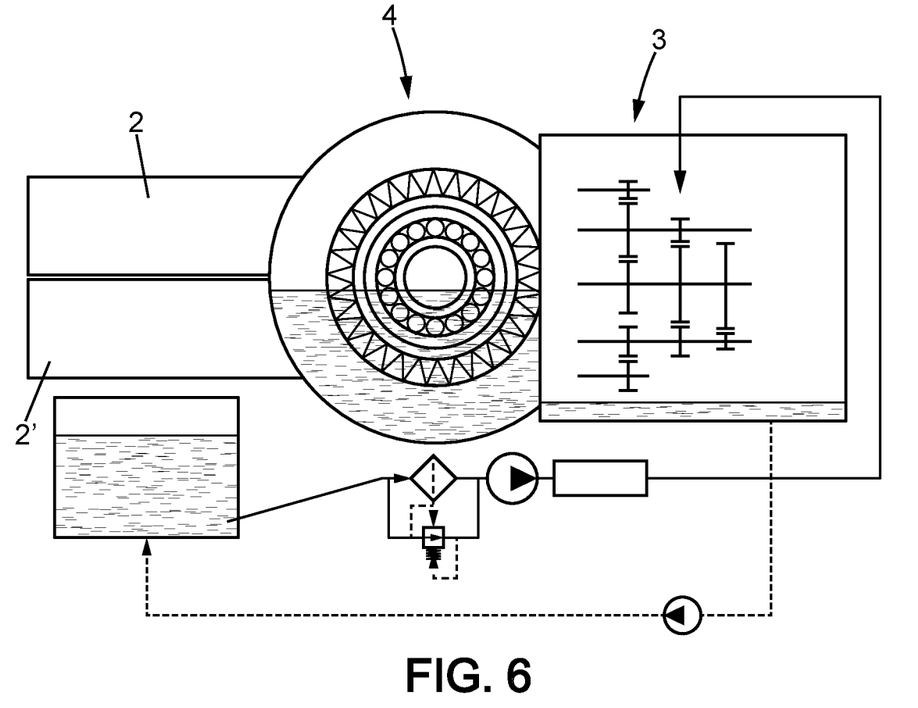
FIG. 6 is a schematic view of the non-claimed disclosure having a dray sump design at gearbox lubrication system, including a storage area for the oil which is separated from gearbox oil sump, but also separated from axle oil sump, requiring thus an extra reservoir, supplementary to both gearbox oil sump and axle oil sump, and thus a lack of space for the other part, this design enabling to reduce splashes loss at the gearbox level only, and not reducing splashes losses at the axle level.

Still, and according to an advantageous feature, said oil storage area is formed in the axle oil sump 43, as shown in FIGS. 3 and 4. It is thus possible to implement a dry sump lubrication system at gearbox 3 without requiring a specific (extra) oil reservoir, distinct from axle oil sump 43, and contrary to the non-claimed disclosure of FIG. 6. Said axle lubricating device and said gearbox lubricating device according to the claimed disclosure are thus deprived of an oil reservoir which is distinct from the axle oil sump 33 and the gearbox oil sump 44, as shown in FIGS. 3 and 4.

It is thus possible to implement a dry sump lubrication system at gearbox, in order to reduce splashes losses at gearbox compared to a (fully) wet sump lubrication system, improving efficiency, advantageously without being detrimental to the compactness of the powertrain assembly that does not require such an extra oil reservoir.

According to an optional advantageous embodiment, said scavenge pump 5 conveys oil to lubricate movable parts in axle housing 40 at a high delivery point HD whose level position $L_{HD}$ is higher than the level $L_O$ of oil in the axle oil sump 43, said high delivery point HD being configured so that the conveyed oil lubricates the movable parts before falling in the axle oil sump 43.

According to an optional advantageous embodiment, said scavenge pump 5 conveys oil to lubricate movable parts of electric motor 2, 2' for example output shaft gear and/or bearing.

According to this embodiment, first duct 6 conveys oil to lubricate the movable parts in axle housing at said high delivery point HD that enables a good lubrication of the movable parts by the falling oil, while having a lower oil in axle oil sump level compared to the same lubrication performance with a full wet sump system that is deprived of the benefit of the high delivery point. Lowering the level of oil in axle oil sump compared to a full wet sump system enables to reduce splashes losses at the axle oil sump.

Advantageously, this embodiment provides a synergic effect that enables to reduce splashes losses compared to full wet sump lubrication system (e.g. at gearbox and axle), not only by having a dry sump at gearbox, but furthermore by lowering level of oil at axle oil sump. Splashes losses and efficiency is improved not only in gearbox, but furthermore in the axle housing.

According to inventor's findings it is furthermore possible to take good advantages to the fact that both gearbox and axle use the same oil for cooling/lubrication.

First, the axle housing 40 and the gearbox housing 30 being contiguous and sharing the same oil, according to inventor's observations, it is thus not necessary to provide a tight oil seal system, complex and costly, between gearbox housing and axle housing. Therefore, the internal atmosphere of axle housing and the internal atmosphere of gearbox housing may be advantageously in gas communication (e.g. when the powertrain is deprived of such tight oil seal system).

According to such embodiment, the axle housing 40 and the gearbox housing 30 may advantageously share a single breathing system configured to equilibrate the pressure of the internal atmosphere of axle housing 40 and the pressure of the internal atmosphere of gear box housing 30 with the pressure of an outside atmosphere. It is thus possible to reduce cost compared to a powertrain assembly having two breathing systems, respectively for the gearbox housing and the axle housing when a oil tight seal is separating gearbox housing and axle housing.

According to another embodiment, the axle oil sump 43 and the gearbox oil sump 33 may share a single oil filing input at axle housing 40 (e.g. instead of having two oil inlets respectively at gearbox housing 30 and at axle housing 40).

According to an embodiment, the gearbox lubricating system may comprise an oil cooler 9 configured to cool oil conveyed by first duct 6. Alternatively, the cooler 9 may be configure to cool oil conveyed by second duct 8. An oil filter 10 may be configured to protect main pump 7. Possibly a by-pass valve 11 may be configured to bypass said oil filter when said oil filter is clogged.

According to an embodiment, the scavenge pump and/or main pump is driven mechanically by a shaft that receives power from axle's movable part, or the gear box. Alternatively, the scavenge pump and/or main pump may be an electrical pump Powertrain assembly according to the present disclosure is advantageous as it improves efficient compared to a (full) wet sump system by reducing splashes losses, at least at the gearbox which is a dry sump lubrication device, and possibly moreover at axle oil sump by enabling a reduction of oil level at axle oil sump when said high delivery point HD is implemented.

Powertrain assembly according to the present disclosure is furthermore advantageous as it improves efficiency without deteriorating the compactness of the powertrain that does not need an extra reservoir (e.g. in addition to already existent axle oil sump).

It should be noted that the scavenge pump 5 is a single inlet pump. Also, the main pump 7 is a single inlet pump. Single inlet pumps are reliable, cost-effective pumps.

It should be noted that delivery point HD of duct 6 is located above the axle axis. Since oil delivery points are arranged above gears (both in axle/differential and in gearbox), lubricating oil is conveyed by gravity onto the movable parts and lubricate them before falling in the sump area.

As a result, as mentioned above, less oil is required in the axle casing when comparing the promoted configuration to a full wet sump system (where more oil is necessary in the bottom of axle casing.

REFERENCE SIGNS LIST

1. Power train assembly;
2. 2' Electric motor,
3. Gearbox,
30. Gearbox housing,
31, 31'. Input gear wheel (respectively for both electric motor 3, 2')
32. Output gear wheel
33. Gearbox oil sump,
4. Axle,
40. Axle housing,
41, 42. respectively first shaft and second shaft,
43. Axle oil sump
5. Scavenge pump,
6. First duct,
7. Main pump,
8 Second duct,
9. Oil cooler,
10 Oil filter,
11. By-pass valve,
12. Differential gear,
120, Differential ring wheel (input)
121, 122 respectively first and second output.

The invention claimed is:

1. A powertrain assembly comprising:
   one or several electric motors,
   a gearbox comprising a gearbox housing receiving gears therein, including at least one input gear wheel, engaged with said electric motor, and an output gear wheel,
   an axle comprising:
   an axle housing,
   movable parts inside axle housing, comprising a shaft for a wheel, said shaft receiving power from the output gear wheel,
   a lubricating system comprising an axle lubricating device comprising an axle oil sump disposed inside the axle housing and a gearbox lubricating device comprising a gearbox oil sump inside the gearbox housing,
   wherein said gearbox lubricating device is a dry sump lubricating system, comprising:
   an oil storage area which is separate from said gearbox oil sump,
   a scavenge pump and a first duct configured to retrieve oil from gear box oil sump and to convey the retrieved oil up to the oil storage area, and,
   a main pump and a second duct configured to convey oil from the storage oil area to lubricate the gears of the gearbox, via at least a spraying nozzle,
   and wherein said oil storage area is formed in the axle oil sump, wherein the scavenge pump conveys oil to lubricate movable parts in the axle housing at a high delivery point (HD) whose level position ($L_{HD}$) is higher than the level ($L_O$) of oil in the axle oil sump, said high delivery point being configured so that the conveyed oil lubricates the movable part before falling in the axle oil tank, wherein the axle housing is interposed between the gearbox housing and the one or several electric motors.

2. A powertrain according to claim 1 wherein the axle housing and the gearbox housing are contiguous, the internal atmosphere of axle housing and the internal atmosphere of gear box housing being in gas communication.

3. A powertrain according to claim 2 wherein the axle housing and the gearbox housing share a single breathing system configured to equilibrate the pressure of the internal atmosphere of axle housing and the pressure of the internal atmosphere of gear box housing with the pressure of an outside atmosphere.

4. A powertrain according to claim 1, wherein the axle oil sump and the gearbox oil sump share a single oil filing input at axle housing.

5. A powertrain according to claim 1 wherein the lubricating system comprises an oil cooler configured to cool oil conveyed by first duct, or to cool oil conveyed by second duct.

6. A powertrain according to claim 1 comprising an oil filter configured to protect main pump, and a by-pass valve configured to bypass said oil filter when said oil filter is clogged.

7. A powertrain according to claim 1 wherein said gearbox comprises a system configured to change the gear ratio between output gear wheel and input gear wheel.

8. A powertrain assembly according to claim 1 wherein the movable parts in axle housing comprises: a differential gear having a differential ring wheel at input, a first output and a second output, said differential ring wheel engaged with output gear wheel of said gearbox, a first shaft for a first wheel and a second shaft for a second wheel coupled respectively to first output and second output of said differential gear.

9. A powertrain assembly according to claim 1, wherein the scavenge pump and/or the main pump is driven by a shaft that receives power from axle's movable parts, or receives power from the gear box.

10. A powertrain assembly according to claim 1, wherein the scavenge pump and/or the main pump is an electrical pump.

11. A powertrain assembly according to claim 1, wherein said axle lubricating device and said gearbox lubricating device are deprived of an oil reservoir which is distinct from the axle oil sump and the gearbox oil sump.

12. A powertrain assembly according to claim 1, wherein the scavenge pump conveys oil to lubricate movable parts of said electric motor.

13. A vehicle chosen among trucks, buses, or construction equipment comprising a powertrain assembly according to claim 1.

14. A powertrain assembly comprising:
   one or several electric motors;
   a gearbox comprising a gearbox housing receiving gears therein, including at least one input gear wheel, engaged with said electric motor, and an output gear wheel;
   an axle comprising:
   an axle housing;
   movable parts inside the axle housing, comprising a shaft for a wheel, said shaft receiving power from the output gear wheel;
   a lubricating system comprising an axle lubricating device comprising an axle oil sump disposed inside the axle housing and a gearbox lubricating device comprising a gearbox oil sump inside the gearbox housing;
   wherein said gearbox lubricating device is a dry sump lubricating system, comprising:
   an oil storage area which is separate from said gearbox oil sump;

a scavenge pump and a first duct configured to retrieve oil from gear box oil sump and to convey the retrieved oil up to the oil storage area; and, a main pump and a second duct configured to convey oil from the storage oil area to lubricate the gears of the gearbox, via at least a spraying nozzle;

and wherein said oil storage area is formed in the axle oil sump wherein said scavenge pump conveys oil to lubricate movable parts of electric motor including an output shaft gear and/or a bearing of the electric motor, wherein the axle housing is interposed between the gearbox housing and the one or several electric motors.

15. A powertrain according to claim 14, comprising two electric motors.

* * * * *